(12) United States Patent
Hobday et al.

(10) Patent No.: US 7,809,639 B2
(45) Date of Patent: Oct. 5, 2010

(54) SYSTEM AND METHOD TO PROVIDE INTEROPERABLE SERVICE ACROSS MULTIPLE CLIENTS

(75) Inventors: Donald Kenneth Hobday, Blacklick, OH (US); Michael Wayne Earley, Galloway, OH (US)

(73) Assignee: CheckFree Services Corporation, Norcross, GA (US)

( * ) Notice: Subject to any disclaimer, the term of this patent is extended or adjusted under 35 U.S.C. 154(b) by 1609 days.

(21) Appl. No.: 10/109,037

(22) Filed: Mar. 29, 2002

(65) Prior Publication Data

US 2003/0187745 A1    Oct. 2, 2003

(51) Int. Cl.
*G06Q 40/00*     (2006.01)
*G06F 15/16*    (2006.01)
(52) U.S. Cl. .................... 705/40; 705/35; 709/203; 709/228; 709/246
(58) Field of Classification Search ............... 705/40, 705/35; 709/203, 228, 246
See application file for complete search history.

(56) References Cited

U.S. PATENT DOCUMENTS

| | | | | |
|---|---|---|---|---|
| 5,493,692 A | * | 2/1996 | Theimer et al. ............ 455/26.1 |
| 5,502,839 A | * | 3/1996 | Kolnick ..................... 710/1 |
| 5,517,635 A | * | 5/1996 | Cross et al. ................ 719/316 |
| 5,787,403 A | * | 7/1998 | Randle ........................ 705/43 |
| 5,867,153 A | * | 2/1999 | Grandcolas et al. .......... 705/39 |
| 5,933,816 A | * | 8/1999 | Zeanah et al. ................ 705/35 |
| 6,003,019 A | * | 12/1999 | Eaton et al. .................... 705/42 |
| 6,157,924 A | * | 12/2000 | Austin .......................... 707/10 |
| 6,212,550 B1 | * | 4/2001 | Segur ......................... 709/206 |
| 6,292,480 B1 | * | 9/2001 | May ............................ 370/352 |
| 6,304,857 B1 | * | 10/2001 | Heindel et al. ................ 705/34 |
| 6,332,131 B1 | * | 12/2001 | Grandcolas et al. .......... 705/35 |
| 6,493,685 B1 | * | 12/2002 | Ensel et al. .................... 705/40 |
| 6,829,591 B1 | * | 12/2004 | Bresnan et al. ............... 705/40 |
| 6,832,212 B1 | * | 12/2004 | Zenner et al. ................. 705/40 |
| 7,035,383 B2 | * | 4/2006 | O'Neal ..................... 379/88.13 |
| 7,103,806 B1 | * | 9/2006 | Horvitz ........................ 714/43 |
| 7,143,142 B1 | * | 11/2006 | Piersol ....................... 709/217 |
| 7,155,477 B2 | * | 12/2006 | Blair et al. .................. 709/203 |
| 7,249,344 B1 | * | 7/2007 | Zeanah et al. ............... 717/100 |
| 7,330,895 B1 | * | 2/2008 | Horvitz ....................... 709/227 |
| 7,389,351 B2 | * | 6/2008 | Horvitz ....................... 709/227 |
| 7,502,752 B1 | * | 3/2009 | Lemons et al. ................ 705/35 |
| 2001/0049721 A1 | * | 12/2001 | Blair et al. .................. 709/203 |
| 2002/0069105 A1 | * | 6/2002 | do Rosario Botelho et al. .. 705/14 |

(Continued)

OTHER PUBLICATIONS

Oracle, Oracle 8i Application Developer's Guide—XML, 2000, Part No. A86030-01, pp. 1-14.*

*Primary Examiner*—Jagdish N Patel
*Assistant Examiner*—Kenneth L Bartley
(74) *Attorney, Agent, or Firm*—Sutherland Asbill & Brennan LLP

(57) ABSTRACT

Methods and systems for servicing requests made from any of multiple user interfaces associated with a user are provided. A request from one of the plurality of user interfaces is received. Information associated with each of the plurality of user interfaces is retrieved, and based upon the retrieved information and the received request, a set of features to be included in a user presentation is selected. The user presentation is then generated based on the selected set of features, and transmitted to the user interface from which the request was received.

21 Claims, 11 Drawing Sheets

U.S. PATENT DOCUMENTS

2002/0069244 A1* 6/2002 Blair et al. ................. 709/203
2002/0103935 A1* 8/2002 Fishman et al. ............ 709/246
2002/0112035 A1* 8/2002 Carey et al. ................ 709/219
2003/0046401 A1* 3/2003 Abbott et al. ............... 709/228
2003/0195811 A1* 10/2003 Hayes et al. ................. 705/26
2008/0183753 A1* 7/2008 Maes ...................... 707/104.1

* cited by examiner

|  | PRODUCTS | | |
|---|---|---|---|
| SERVICES | Product 1 | Product 2 | Product 3 |
| Service 1 | Feature 1 | Feature 1 | Feature 1 | — 405A
| | Feature 2 | --- | --- | — 405B
| | --- | --- | Feature 3 | — 405C
| | Feature 4 | Feature 4 | Feature 4 | — 405D
| Service 2 | Feature 5 | Feature 5 | Feature 5 | — 405E
| | Feature 6 | Feature 6 | Feature 6 | — 405F
| Service 3 | --- | Feature 7 | --- | — 405G
| | Feature 8 | Feature 8 | Feature 8 | — 405H
| | Feature 9 | Feature 9 | Feature 9 | — 405I
| | Feature 10 | --- | Feature 10 | — 405J

| | PRODUCTS | | |
|---|---|---|---|
| SERVICES | Product P1 | Product P2 | Product P3 |
| Pay-anyone bill payments | Add one time payment | Add one time payment | Add one time payment |
| | --- | Add extended payment information | Add extended payment information |
| | Add monthly recurring payments | Add monthly recurring payments | Add monthly recurring payments |
| | Add weekly recurring payments | --- | Add weekly recurring payments |
| | --- | --- | Add twice monthly recurring payments |
| | Present history | --- | Present history |
| Electronic Billing | Present bill summary | Present bill summary | Present bill summary |
| | Present bill detail | Present bill detail | --- |
| | Present advertising | --- | --- |
| | --- | Submit bill payment | --- |
| Person-to-person payments | Add person-to-person payment | Add person-to-person payment | --- |
| | Add electronic greeting card | --- | --- |
| | --- | Add person-to-person invitation | --- |

| SERVICES | PRODUCTS | |
| --- | --- | --- |
| | Product P1 | Product P2 |
| Pay-anyone bill payments | Add one time payment | Add one time payment |
| | --- | Add extended payment information |
| | Add monthly recurring payments | Add monthly recurring payments |
| | Add weekly recurring payments | --- |
| | --- | --- |
| | Present history | --- |
| Electronic Billing | Present bill summary | Present bill summary |
| | Present bill detail | Present bill detail |
| | Present advertising | --- |
| | --- | Submit bill payment |
| Person-to-person payments | Add person-to-person payment | Add person-to-person payment |
| | Add electronic greeting card | --- |
| | --- | Add person-to-person invitation |

| | PRODUCTS | |
|---|---|---|
| SERVICES | Product P1 | Product P3 |
| Pay-anyone bill payments | Add one time payment | Add one time payment |
| | --- | Add extended payment information |
| | Add monthly recurring payments | Add monthly recurring payments |
| | Add weekly recurring payments | Add weekly recurring payments |
| | --- | Add twice monthly recurring payments |
| | Present history | Present history |
| Electronic Billing | Present bill summary | Present bill summary |
| | Present bill detail | --- |
| | Present advertising | --- |
| | --- | --- |
| Person-to-person payments | Add person-to-person payment | --- |
| | Add electronic greeting card | --- |
| | --- | --- |

|  | PRODUCTS | |
|---|---|---|
| SERVICES | Product P2 | Product P3 |
| Pay-anyone bill payments | Add one time payment | Add one time payment |
| | Add extended payment information | Add extended payment information |
| | Add monthly recurring payments | Add monthly recurring payments |
| | --- | Add weekly recurring payments |
| | --- | Add twice monthly recurring payments |
| | --- | Present history |
| Electronic Billing | Present bill summary | Present bill summary |
| | Present bill detail | --- |
| | --- | --- |
| | Submit bill payment | --- |
| Person-to-person payments | Add person-to-person payment | --- |
| | --- | --- |
| | Add person-to-person invitation | --- |

FIG. 5D

SYSTEM AND METHOD TO PROVIDE INTEROPERABLE SERVICE ACROSS MULTIPLE CLIENTS

FIELD OF THE INVENTION

The present invention relates to electronic commerce and more particularly to the delivery of electronic commerce services across multiple clients.

BACKGROUND OF THE INVENTION

A consumer Service Provider (CSP) is an entity that offers one or more electronic commerce (EC) services to a base of customers. The customers can be individuals, businesses, organizations, or any other type entity utilizing EC services. CSPs offer EC services via one or more networks, typically the Internet, though some CSPs offer EC services via other public and proprietary networks. Different CSPs may offer different EC services. Further, some CSPs offer other services than EC services. Examples of CSPs include financial institutions, Web portals, or other types of Web sites or business entities. CSPs are also known as sponsors.

A service Provider (SP) is an entity that provides EC functionality. A SP can provide EC functionality on behalf of one or more CSPs, or directly to customers not associated with CSPs. Typically, when a SP provides EC functionality on behalf of a CSP, a customer of the CSP accesses the CSP and is redirected to the service provider. Alternatively, a SP acting on behalf of a CSP sometimes has no communication with a customer. In such situations, the CSP interacts with both a customer and the SP. Communications between the CSP and the SP in such situations are by way of an application program interface (API), such as CSAPI (online in-session) or SIS (batch out-of-session). Often the fact that a SP is providing functionality on behalf of a CSP is unknown to the consumer. That is, a SP acts behind the scenes on behalf of a CSP. A service provider also often provides EC functionality directly to customers. That is, in these situations, a SP is not acting on behalf of a CSP. For those customers not utilizing a CSP, they directly access the service provider via a network. Also, some SPs provide functionality for other types of services other than EC services. EC functionality directly to customers. That is, in these situations, a SP is not acting on behalf of a CSP. For those customers not utilizing a CSP, they directly access the service provider via a network. Also, some SPs provide functionality for other types of services other than EC services.

A product is a client user interface (UI) that supports one or more EC or other services. Products include proprietary PC-based UIs, proprietary telephone-based UIs, proprietary Web-based UIs, and proprietary wireless UIs, as well as third party UIs. Different versions of a given product may support different services, or differently support the same service or services.

EC Services, introduced above, is a set of related electronic commerce services that is offered across different products. Examples of EC services include bill payment, electronic billing, and person-to-person payment. Other EC services include investment services, such as security trading, portfolio management, and financial planning, retail point-of-sale payments, Web-based retail purchases, tax filings and associated payments, and financial records reconciliation. Electronic bill presentment and payment services are often bundled together, and are commonly known as electronic billing and payment (EBP) services. The same service is often supported differently across products. The processing to support a service can be different across products, and features of a service can be different across products.

FIG. 1 is a simplified depiction of the relationships between a service provider 101, a CSP 105, and multiple customers $C_1$-$C_N$. As shown, customers $C_1$-$C_3$ and $C_{16}$-$C_N$ are provided EC services via a first product, $P_1$, customers $C_4$-$C_6$ and $C_{10}$-$C_{12}$ are provided EC services via a second product, $P_2$, and customers $C_7$-$C_9$ and $C_{13}$-$C_{15}$ are provided EC services via third product, $P_3$. Customers $C_1$-$C_9$ access EC services through CSP 105, and customers $C_{10}$-$C_N$ access EC services directly through the service provider 101. Customers utilizing the same product access either the SP 101 or the CSP 105 via the same type network, i.e., the Internet, another public network, a propriety network, or the public switched telephone network.

At step 170 the identity of the CSP with which the customer is associated is determined from data stored in the interoperability database (customer profile data). The service provider 201 then accesses the interoperability database (CSP profile data) and attempts to locate information associated with the customer's CSP, step 180. The service provider 201, at step 190, determines if information associated with the customer's CSP is found in the interoperability database. If not, an error message is returned, step 200, and the session is terminated, step 370 (FIG. 3C). If the service provider 201 determines that information associated with the CSP is included in the interoperability database, operations continue with step 220.

Each product, $P_1$-$P_3$, is independent of the other products. Each product is often independently developed, resulting in each product typically having a unique user interface, unique processing to deliver a service, and unique EC service features. That is, while multiple products may offer one or more of the same EC services, such as bill payment, the processing to achieve that same service, and the features of that same service, often differ between products. Furthermore, each product is associated with a unique data repository. Each repository includes data associated with those customers utilizing that product. Thus, each product can be thought of as an independent silo. The products are not interoperable. That is, there is no linkage between the products.

A customer, according to prior art techniques, can access EC services through more than one product (client UI). However, services provided via one product have no bearing on services offered in other products. This is because, as discussed above, each product is independent of the other products. Thus, for example, a payment directed by the customer using one product would not show up on a payment history accessed using another product, and a transaction submitted via one product could not be modified via another product.

Accordingly, a need exists for a technique for accessing EC services via multiple products in which actions taken via one of the multiple products are reflected in the other products.

Also, a need exists for a technique for accessing EC services via multiple products in which a transaction submitted via one of the multiple products can later be modified via another of the multiple products.

Introduced above, different EC services are often offered via different products, even when those products are supported by the same service provider and accessed via the same CSP. Additionally, when the same EC service is offered via different products by the same service provider, the features of that EC service are often different among the various products.

For example, a first product may offer a pay-anyone bill payment service and an electronic billing service, and a second product may offer a pay-anyone bill payment service and a person-to-person payment service. Further, the first product may offer extended payment information fields in the pay-anyone bill payment service, whereas the second product may not. In this example, electronic billing and extended payment information fields would have no meaning in the second product. Likewise, person-to-person payments would have no meaning in the first product. This situation is often referred to as an impedance mismatch. Thus, the first and the second product cannot be interoperable, because a service of one product is not available in the other product, and because a feature in one product is not present in the other product.

One proposed technique for overcoming impedance mismatch between products is to modify the services and/or features offered in the products to be the same. That is, the services and/or products offered would be the lowest common denominator among the products. That is, if certain functionality cannot be supported by a given product, that functionality would not be offered in any product. This is undesirable because it results in no differentiation between the products.

Accordingly, a need exists for a technique to provide multiple interoperable products in which the unique characteristics of each product are retained.

Though not depicted in FIG. 1, a service provider is typically associated with multiple CSPs. Different CSPs have different customer bases, having different EC needs. Furthermore, different CSPs have different business models. These factors result in different CSPs offering different combinations of EC services and products to their customer base, even when the same service provider provides the EC services. Also, some CSPs offer different combinations of services and products to different customers. CSPs may offer different combinations for a variety of reasons, including providing choice and convenience to their customers. Furthermore, some CSPs offer "value-add" features to an offered service. A product including a value-add feature can be thought of as one version of a product. Often times a value-add feature is only offered to a portion of a CSPs customer base, and often for a fee.

Discussed above, one proposed method of providing interoperable products is to modify the products to offer the same services and features. Such a solution is inconsistent with different CSPs offering different services or value-add features, as there would be no differentiation between the products.

Accordingly, a need exists for a technique for providing interoperable products in which different combinations of products can be offered in an interoperable fashion.

Also, a need exists for a technique for providing interoperable products in which different combinations of services and features can be offered in an interoperable fashion.

OBJECTS OF THE INVENTION

It is an object of the present invention to provide interoperable service between multiple products in which actions taken via one product are reflected in the other products.

It is also an object of the present invention to provide interoperable service between multiple products in which a directive submitted via one product can be modified via another product.

It is still a further object of the present invention to provide a technique for interoperable service between multiple products in which the unique characteristics of each product are retained.

It is yet a further object of the present invention to provide a technique for interoperable service between multiple products in which different combinations of the multiple products are offered in an interoperable fashion.

It is another object of the present invention to provide a technique for interoperable service between multiple products in which different combinations of services and features of the multiple products are offered in an interoperable fashion.

The above-stated objects, as well as other objects, features, and advantages, of the present invention will become readily apparent from the following detailed description which is to be read in conjunction with the appended drawings.

SUMMARY OF THE INVENTION

In accordance with the present invention, a method and a system for servicing a request made from any of multiple user interfaces associated with a user are provided. The user interfaces include, but are not limited to, personal computer-based user interfaces, telephone-based user interfaces, Web-based user interfaces, and wireless device-based user interfaces. The user is associated with two or more different user interfaces. The two or more user interfaces could be different interfaces of the same type, i.e., two or more personal computer-based user interfaces, could be different interfaces of different types, i.e., a personal computer-based user interface and a Web-based user interface, or any combination of the same and different types of user interfaces.

The system includes a storage device and a processor. The storage device could be any type of storage device capable of storing data, including, but not limited to, hard, floppy, and/or optical disk, and the processor could be any type of processor capable of functioning to implement the method as described herein.

A user request is received from one of a plurality of user interfaces associated with the user. Association of interfaces with a user will be discussed further below. That is, the user uses any of the plurality of user interfaces to make a request. The user request is preferably a request for a service to be provided to the user, though the request could be any type request received from a user interface. If the request is for a service, the service could be any type of service provided via a user interface. Each user interface is associated with a plurality of features. That is, each of the plurality of user interfaces has a set of features. These features can include some features which are common to two or more user interfaces, and can include features which are unique to one of the plurality of user interfaces.

Stored information associated with each of the plurality of user interfaces is retrieved. Thus, upon receipt of a request from one of the plurality of user interfaces, information associated with each of the plurality of user interfaces associated with the user is retrieved.

Based upon the received request and the retrieved information, a set of features to be included in a user presentation is selected. The set of features to be included in the user presentation is not solely dependent upon the user interface from which the request was received. Rather, the set of features is selected based upon the received request in combination with the retrieved information associated with each of the plurality of user interfaces with which the user is associated.

Based upon the selected set of features, the user presentation is generated and transmitted to the user interface from which the request was received. The user presentation could be an aural presentation, a visual presentation, or a combination aural and visual presentation. This transmission could be a transmission via a network such as the public switched telephone network, the Internet, or any other type network capable of transmitting a user presentation. Or, the transmission could be a transmission via a dedicated link to the user interface.

According to one aspect of the invention, the selected set of features includes at least one feature which is not a feature of at least one of the plurality of user interfaces. That is, one of the plurality of user interfaces lacks a feature that another of the plurality of user interfaces has.

According to another aspect of the invention, the at least one feature which is not a feature of at least one of the plurality of user interfaces is a feature which causes stored information to be presented. According to yet another aspect of the invention, the request is a first request for a service, the selected set of features is a selected first set of features, and the user presentation is a first user presentation. A second request for the service is received from another of the plurality of user interfaces associated with the user. The plurality of features associated with this second user interface is different than the plurality of features associated with the user interface from which the first request was received, i.e., the first user interface. Thus, a request for the same service is received from the same user using a different user interface having a different plurality of features than the first user interface.

The stored information associated with each of the plurality of user interfaces associated with the user is once again retrieved. Based upon the received second request and the retrieved information, a second set of features to be included in a second user presentation is selected. The second set of features is different than the first set of features. As above, the set of features to be included in the second user presentation is not solely dependent upon the user interface from which the second request was received. Rather, this second set of features is selected based upon the received second request in combination with the retrieved information associated with each of the plurality of user interfaces with which the user is associated. Based upon the selected second set of features, the second user presentation is generated and transmitted to the user interface from which the second request was received.

According to still another aspect of the invention, the request is a first request, the selected set of features is a selected first set of features, and the user presentation is a first user presentation. In this aspect, a response to the transmitted first user presentation is received, and information associated with the received response is stored.

A second request is received from another of the plurality of user interfaces associated with the user. The second request is a request to receive the stored information associated with the received response. The plurality of features associated with this second user interface is different than the plurality of features associated with the user interface from which the first request was received, i.e., the first user interface.

The stored information associated with each of the plurality of user interfaces associated with the user is again retrieved. Based upon the received second request and the retrieved information associated with the plurality of user interfaces associated with the user, a second set of features to be included in a second user presentation is selected. The second set of features is different than the first set of features. As above, the set of features to be included in the second user presentation is not solely dependent upon the user interface from which the second request was received. The stored information associated with the received response is retrieved.

The second user presentation is generated, based upon the selected second set of features. The generated second user presentation includes the retrieved information associated with the received response. The second user presentation is transmitted to the user interface from which the second request was received. Thus, in accordance with this aspect of the invention, information received responsive to a first user presentation presented via a first user interface is presented via a second user interface different than the first user interface.

In accordance with yet another aspect of the invention, the retrieved information associated with each of the plurality of user interfaces associated with the user includes information identifying each of the features of each of the plurality of user interfaces associated with the user. The user interface from which the request was received is identified, and the features of the identified user interface are identified. A determination as to which of the features of the user interface from which the request was received are features common to all of the plurality of use interfaces associated with the user is made. Also, a determination as to which of the features of the user interface from which the request was received are features which cause stored information to be presented is made. The selected set of features includes those identified features determined to be features which cause stored information to be presented.

According to another aspect of the invention, the request is received by a service provider. A service provider is an entity which provides at least one service to a user. In this aspect of the invention, the request is either a request to receive an electronic bill or a request for the service provider to make a payment on behalf of the user. Further, the plurality of user interfaces associated with the user includes at least two of the following: a telephone-based user interface, a Web-based user interface, and a user computer-based user interface.

In a further aspect of the invention, the user is associated with a sponsor. A sponsor is an entity which provides access to a service provider on behalf of a user. According to this aspect, the request is received via the one user interface either from the sponsor or from the user. That is, the user, utilizing the one user interface, could either directly access the service provider, or could transmit the request to the sponsor, who in turn would transmit it to the service provider. Or, the request could be generated and transmitted by the sponsor utilizing the one user interface.

For those users associated with a sponsor, the sponsor can determine the association between a user and the plurality of user interfaces. That is, in such a case, the sponsor determines which of the user interfaces will be available in an interoperable fashion. Additionally, a sponsor can determine a different plurality of user interfaces to be associated with a first user than another plurality of user interfaces associated with another user. For users not associated with a sponsor, a service provider can determine which user interfaces are associated with which users. Or, a service provider or sponsor can allow a user to determine the plurality of user interfaces with which that user is associated.

In still another aspect of the invention, at least one of the features in the selected set of features requires a user response to the transmitted user presentation. That is, the user in response to the user presentation will transmit information. At least one required attribute of the user response is determined. An indication of the determined attribute, or attributes, is stored. The user response is received and a determination as to if the received user response has the at least one required attribute is made. The at least one required attribute is at least one of a required form of the user response and a permissible value of the user response.

Also in accordance with the present invention, a method and a system for servicing multiple user requests made from any of multiple user interfaces are provided. A first request is received from a first user interface of a first plurality of user interfaces associated with a first user. Each of the first plurality of user interfaces has a plurality of associated features. A second request is received from a second user interface of a second plurality of user interfaces associated with a second user. The second plurality of user interfaces is different than the first plurality of user interfaces. Each of the second plurality of user interfaces has a plurality of associated features. The first user interface and the second user interface are the same user interface. That is, at least one user interface is common to the first and the second plurality of user interfaces.

Stored information associated with the first plurality of user interfaces is retrieved, as well as stored information associated with the second plurality of user interfaces. A set of first features to be included in a first user presentation for the first user is selected based upon the received first request and the retrieved information associated with the first plurality of user interfaces. The selected first set of features includes one number of features. A set of second features to be included in a second user presentation for the second user is selected based upon the received second request and the retrieved information associated with the second plurality of user interfaces. The set of second features including a number of features different than the number of features of the set of first features.

The first user presentation is generated based upon the selected set of first features and transmitted to the first user. The second user presentation is generated based upon the selected set of second features and transmitted to the second user. Thus, in accordance with this method and system, two users utilizing the same user interface will be presented different features, dependent upon the plurality of user interfaces with which each user is associated.

In accordance with another aspect, the first user interface and the second user interface are each one of a Web-based user interface, a telephone-based user interface, and a user computer-based user interface. The first and second requests are each received by a service provider and are each requests for the same service. That same service is one of electronic bill payment or electronic bill presentment. The selected first set of features includes a feature which is not included in the plurality of associated features of the second user interface.

It will also be understood by those skilled in the art, that the invention is easily implemented using computer software. More particularly, software can be easily programmed, using routine programming skill, based upon the description of the invention set forth herein and stored on a storage medium which is readable by a computer processor of the applicable component, e.g. service provider processor, consumer server provider processor, and/or user device processor, to cause the processor to operate such that the particular component performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 is a simplified depiction of the structure of a product/service table used by the service provider of FIG. 1 in providing interoperable service in accordance with the present invention.

FIG. 5A is an exemplary depiction of a first product/service table including information associated with three products, products 1, 2, and 3, in accordance with the present invention.

FIG. 5B is an exemplary depiction of a second product/service table including information associated with two products, products 1 and 2, in accordance with the present invention.

FIG. 5C is an exemplary depiction of a third product/service table including information associated with two products, products 1 and 3, in accordance with the present invention.

FIG. 5D is an exemplary depiction of a fourth product/service table including information associated with two products, products 2 and 3, in accordance with the present invention.

DETAILED DESCRIPTION OF PREFERRED EMBODIMENT(S)

Though the following discussion focuses on EBP services, it should be understood that the present invention is equally applicable to provision of any type of EC services in an interoperable fashion, as well as provision of any other type of service in an interoperable fashion.

Figure 1:
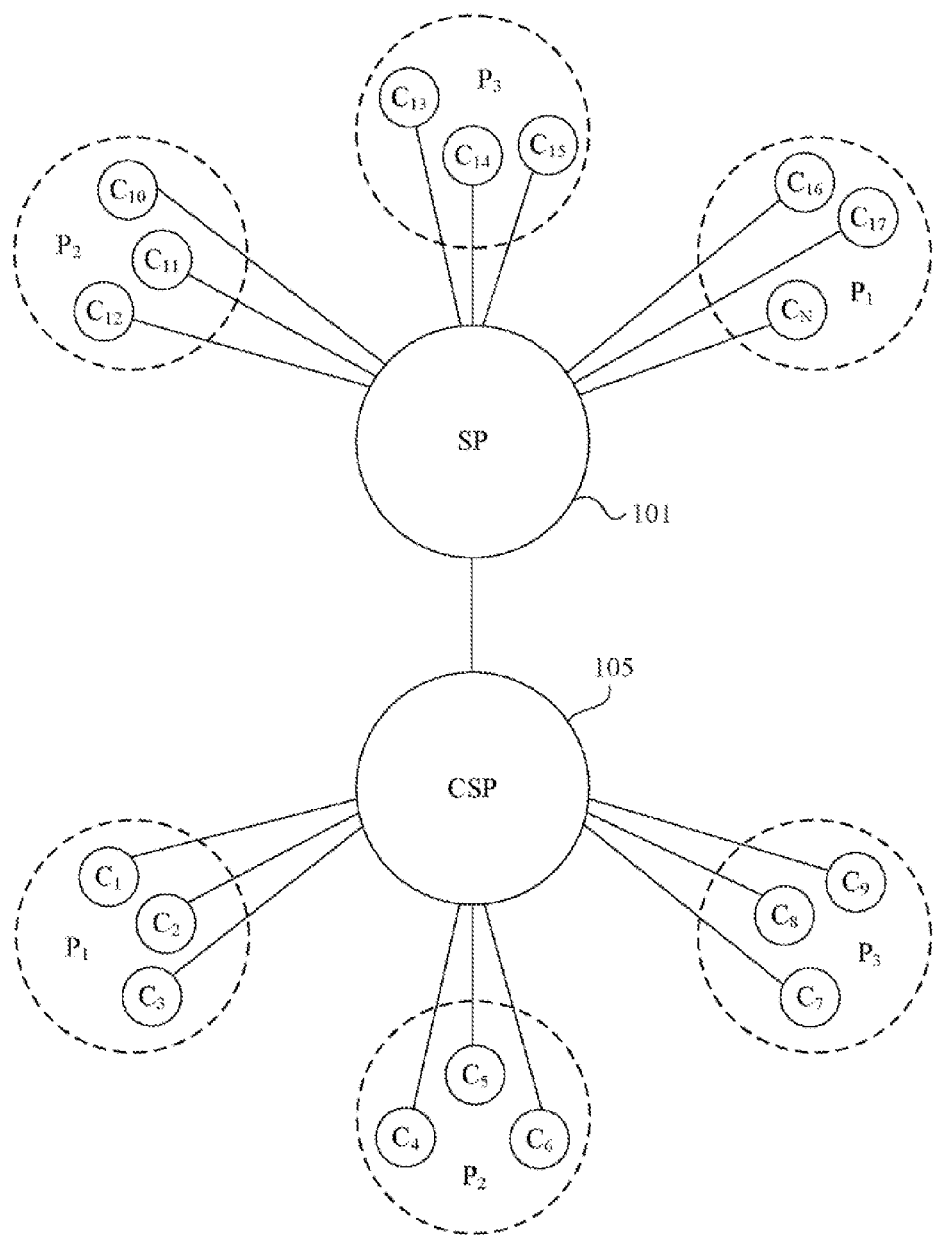
FIG. 1 is a simplified depiction of a prior art electronic commerce network.
Figure 2:
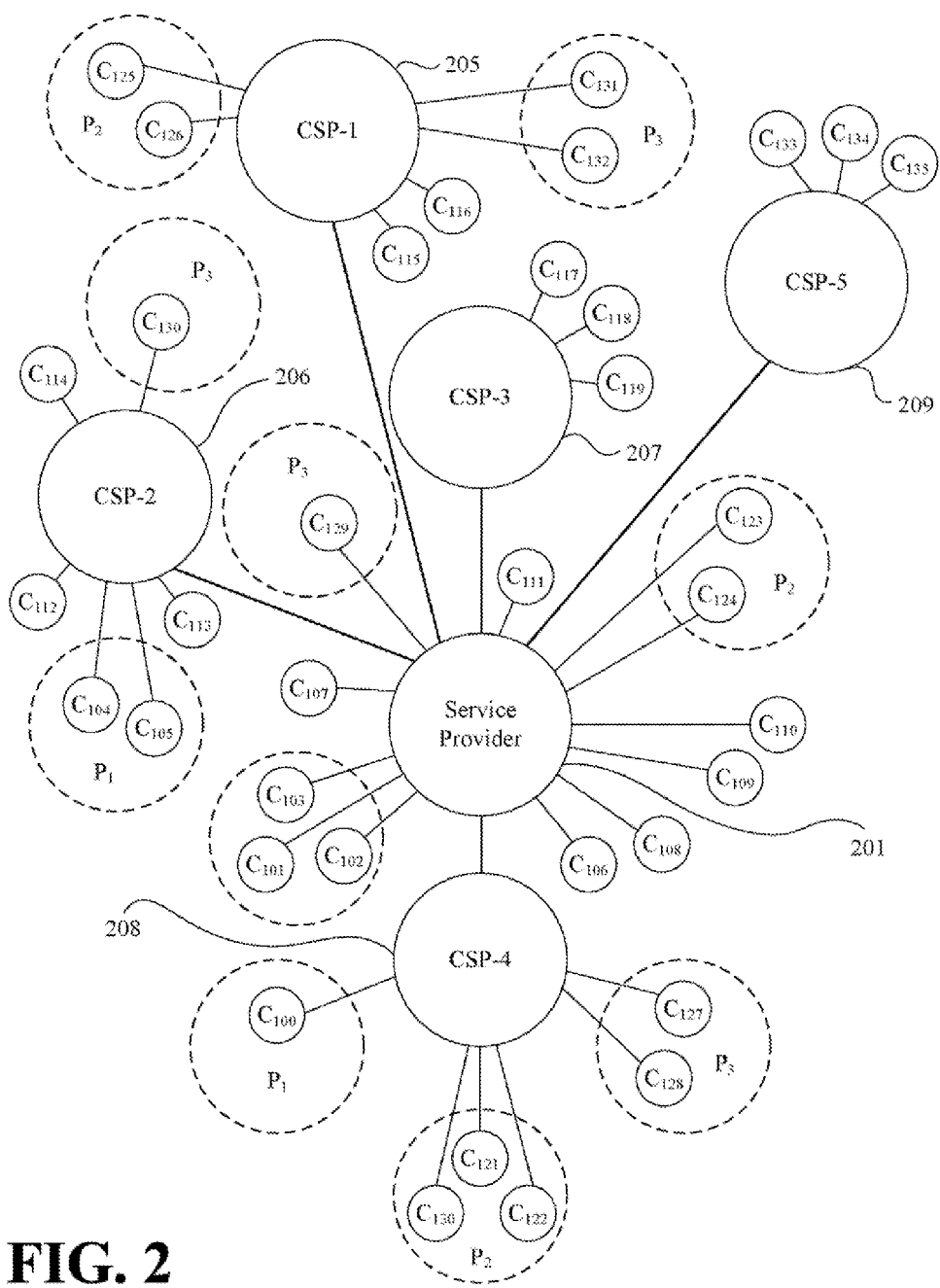
FIG. 2 is a simplified depiction of an electronic commerce network, including a service provider, multiple customer service providers, and multiple customers, in accordance with the present invention.

FIG. 2 is a simplified depiction of the relationships between a service provider 201, multiple CSPs, including CSP-1 205, CSP-2 206, CSP-3 207, CSP-4 208, CSP-5 209 and multiple customers, including customers $C_{100}$-$C_{135}$, in accordance with this embodiment of the present invention. Though only a limited number of CSPs and customers are depicted in FIG. 2, it should be understood that additional CSPs and customers can be supported by a service provider in accordance with the present invention. As shown, customers $C_{100}$, $C_{120}$-$C_{122}$, $C_{127}$, and $C_{128}$ access EBP services through CSP-4 208, customers $C_{106}$-$C_{111}$, $C_{101}$-$C_{103}$, $C_{123}$, $C_{124}$, and $C_{129}$ access EBP services directly through the service provider 201, customers $C_{104}$, $C_{105}$, $C_{112}$-$C_{114}$, and $C_{130}$ access EBP services through CSP-2 206, customers $C_{115}$, $C_{116}$, $C_{125}$, $C_{126}$, $C_{131}$ and $C_{132}$ access EBP services through CSP-1 205, customers $C_{117}$-$C_{119}$ access EBP services through CSP-3 207, and customers $C_{133}$-$C_{135}$ access EBP services through CSP-5 209.

Also as shown in FIG. 2, customers $C_{100}$-$C_{105}$ are provided EBP services exclusively via product $P_1$, customers $C_{120}$-$C_{126}$ are provided EBP services exclusively via product $P_2$, and customers $C_{127}$-$C_{132}$ are provided EBP services exclusively via product $P_3$. Though only three products, $P_1$, $P_2$, and $P_3$, are discussed herein, it should be understood that an additional number of products can be supported by the present invention, as well as only two products. The remaining depicted customers, customers $C_{106}$-$C_{119}$ and $C_{133}$-$C_{135}$, are not limited to one product in being provided EBP services. These customers are provided EBP services via two or more products, to be further discussed below. These customers are said to be interoperable customers.

The service provider 201 is associated with at least one server or other device configured to communicate via one or more networks. The service provider server performs the operations described below in providing interoperable service to customers via multiple products. Each service provider server includes at least one memory for storing programming causing that server to function in accordance with the present invention. Preferably, a service provider server is a commercially available high power, or mainframe, computer. Each service provider server is configured to communicate directly with one or more CSPs and directly with one or more customers.

Each CSP also is associated with at least one server or other device configured to communicate via one or more networks. Each CSP server communicates with the service provider and customers associated with that CSP.

Each customer is associated with at least one customer device. Customer devices include conventional telephones for communicating via the public switched telephone network, commercially available personal computers, personal digital assistants (PDAs), set-top boxes, wireless digital telephones configured for Internet access, and other computing devices capable of communicating via one or more networks.

For a customer accessing EBP services via a CSP, the service provider 201 provides the functionality in providing the EBP services. The CSP, as should be understood from the discussion above, is merely a conduit for that customer to reach the service provider 201. Preferably, in the present embodiment and in the context of product interoperability, no EBP functionality is provided by the CSP. However, a CSP could practice the invention described herein to provide interoperable products.

Each CSP can be configured to redirect a customer to the service provider 201, after which communications in providing EBP services flow between the service provider 201 and the customer. Each CSP can also be configured to pass all communications between the service provider 201 and a customer, as described above. Further, a customer who is associated with a CSP may, in certain embodiments of the present invention, also directly access the service provider 201, without going through or otherwise involving that customer's CSP.

Product $P_1$, in exemplary FIG. 2, is a proprietary Web-based UI. Product $P_2$, in exemplary FIG. 2, is a third party UI. Product $P_3$, in exemplary FIG. 2, is a telephone-based UI. Those customers who are provided EBP services via product $P_1$ or $P_2$ access a service provider server and/or a CSP server utilizing a personal computer or other computing device. Those customers who are provided EBP services via product $P_3$ access a service provider server and/or a CSP server utilizing a conventional telephone.

The service provider maintains various data used in providing interoperable service. This data includes a collection of CSP profiles identifying which of the CSPs offer which products, including the version of those offered products, and which of the CSPs offer interoperability. The data also includes a collection of customer profiles identifying each of the customers, the identity of a CSP, if any, with which a customer is associated, and an indication if a customer is an interoperable customer. Further, for interoperable customers, the customer profiles include an indication of which of the products, and which versions thereof, are available in an interoperable fashion. The data also includes product profiles indicating, for each version of a product, which EBP services each product supports, as well as the features of each service supported by a product. Further, each included feature is indexed, by pointer, into a common row of product/service tables, to be discussed further below. The CSP profiles, customer profiles, and product profiles can be stored distinct from one another. However, preferably, this data is stored together in an interoperability database.

The service provider 201 also maintains a common data repository. The common data repository is information associated with services provided to specific customers. That is, the common data repository stores transaction information. The common data repository stores information such that it is available to all products.

Utilizing the information stored in the interoperability database and the common data repository, and the processing describe below, the service provider 201 provides both interoperable services and non-interoperable services. Further, the interoperability database, common data repository, and processing enable the service provider 201 and CSPs to customize interoperability offerings. Thus, some customers can access EBP services in a non-interoperable fashion, some can access EBP services in an interoperable fashion utilizing all available products, and some can access EBP services in an interoperable fashion utilizing only a subset of the available products.

Importantly, different CSPs can offer different subsets of products in an interoperable fashion, without requiring a modification of the products to a lowest common denominator of the products. Also, CSPs can offer some products in an interoperable fashion, and some products in a non-interoperable fashion.

Furthermore, the present invention allows variability in a service provided via multiple interoperable products, while that service maintains a relatively consistent presentation experience for the customers. Thus, an interoperable customer utilizing any two or more interoperable products will experience functionally similar presentations no matter the product being utilized, while there may be differences in how that service is provided among the various interoperable products. That is, the back-end processing to provide a service can differ among products, while the presentation experience in utilizing the service will be similar among the products.

FIGS. 3A-3D are exemplary flow charts depicting the operations in providing interoperable EBP services to a customer of a CSP in accordance with one embodiment of the present invention.

A customer initiates an EBP session by accessing a service provider server utilizing a customer device. The customer device could be any of the types of customer devices discussed above. The service provider 201, upon initiation of an EBP session, presents a product and customer device-specific initial presentation to the customer, typically a welcome screen or announcement, step 100.

At step 110, the service provider receives an initial customer request for authentication. This request includes, as will be understood by one skilled in the art, information identifying the customer, and perhaps a password or other security information. For requests received via a computing device or other programmed device, the request also includes information identifying the type of customer device and the product and version thereof being utilized by the customer. For requests received via a conventional telephone, the service provider will recognize the product being utilized.

Figure 3A:
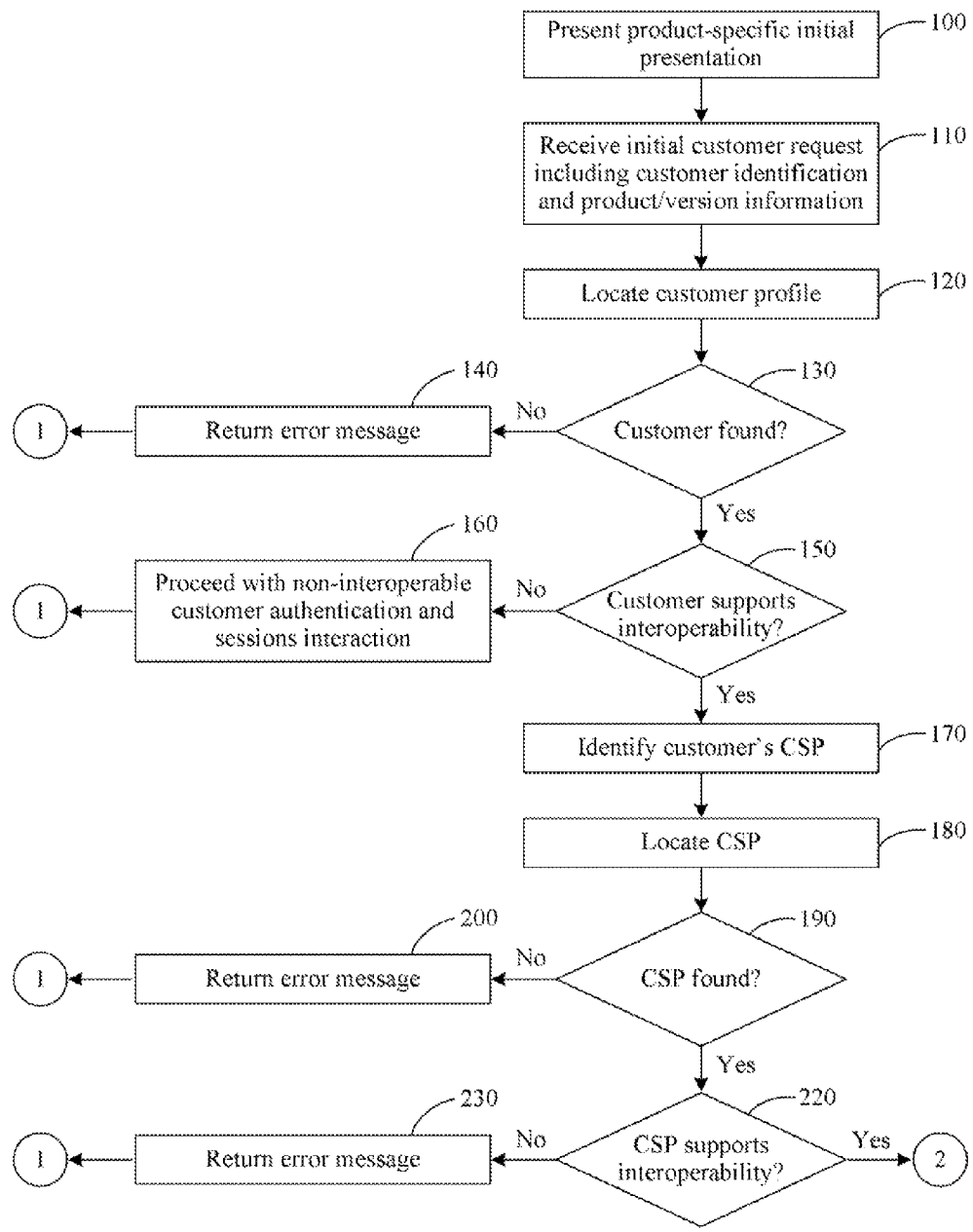
FIGS. 3A-3D depict a simplified flow diagram of operations of the service provider depicted in FIG. 2 in providing interoperable service in accordance with the present invention.
Figure 3B:
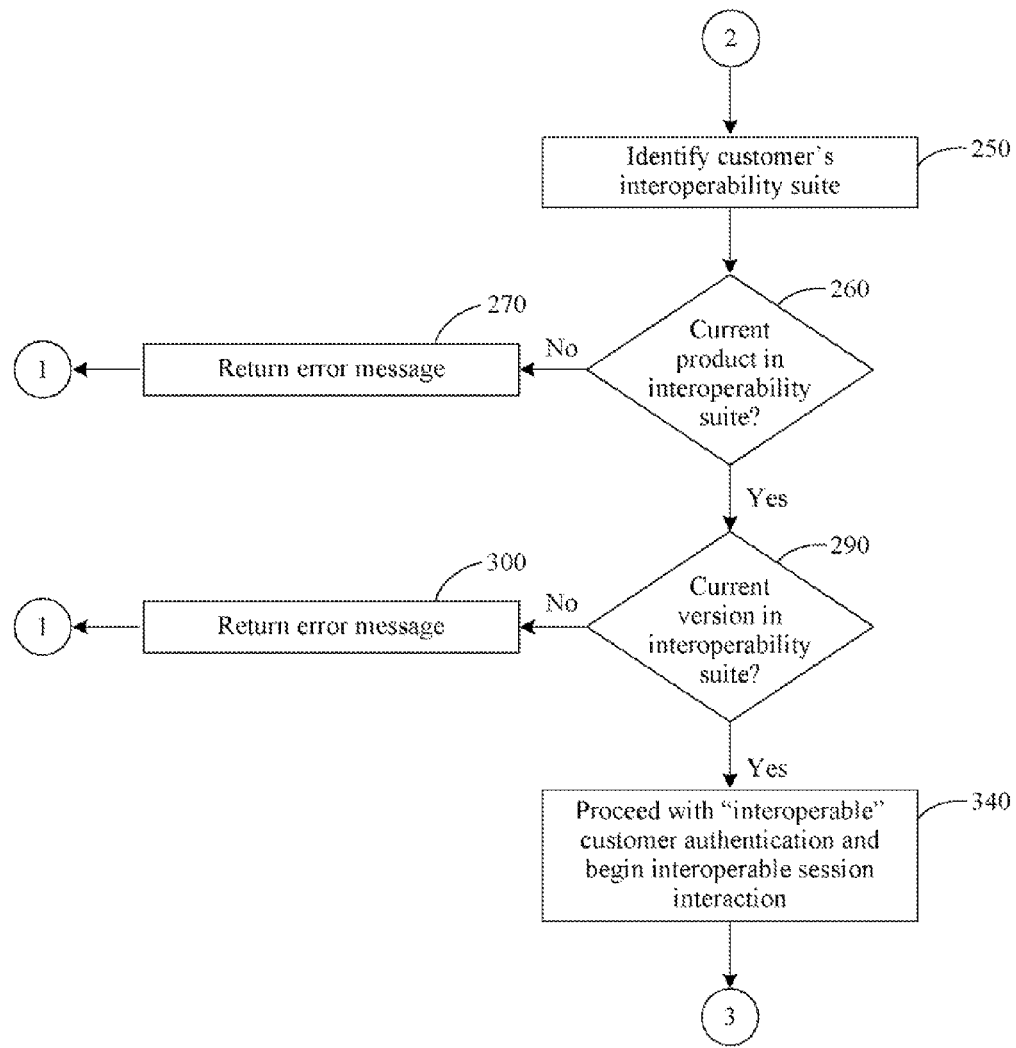
Figure 3C:
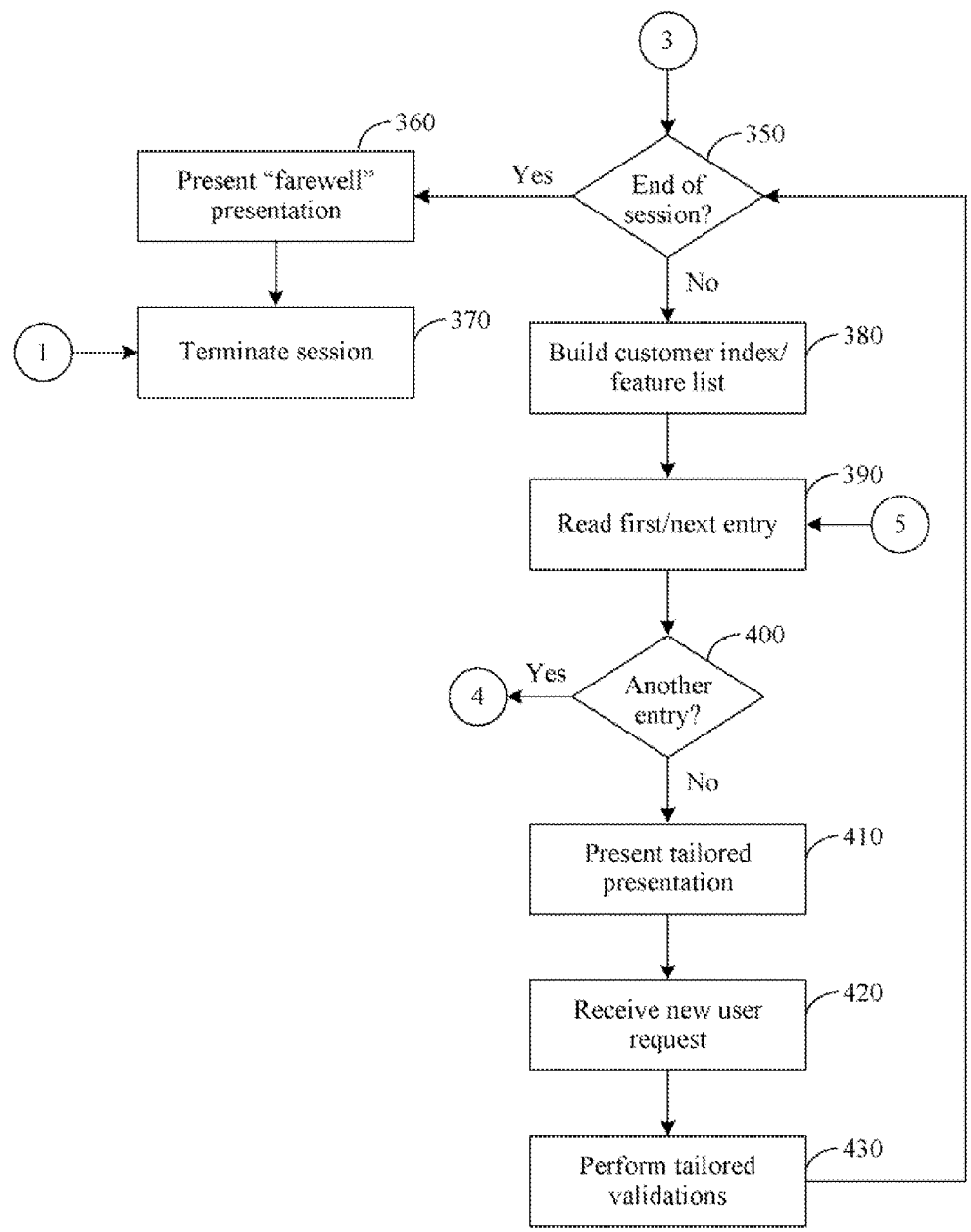

The service provider 201, utilizing the customer-identifying information, accesses the interoperability database (customer profile data) and attempts to locate information associated with the customer, step 120. The service provider 201, at step 130, determines if information associated with the customer is found in the interoperability database. If not, an error message is returned, step 140, and the session is terminated, step 370 (FIG. 3C).

If the service provider 201 determines that information associated with the customer is included in the interoperability database, the service provider 201 determines if that information indicates that the customer is an interoperable customer, step 150. If the customer is not an interoperable customer, the EBP session continues in a non-interoperable mode, step 160, until termination, step 370 (FIG. 3C). If the service provider determines that the customer is an interoperable customer, operations continue with step 170.

At step 170 the identity of the CSP with which the customer is associated is determined from data stored in the interoperability database (customer profile data) The service provider 201 then accesses the interoperability database (CSP profile data) and attempts to locate information associated with the customer's CSP, step 180. The service provider 201, at step 190, determines if information associated with the customer's CSP is found in the interoperability database. If not, an error message is returned, step 200, and the session is terminated, step 370 (FIG. 3C). If the service provider 201 determines that information associated with the CSP is included in the interoperability database, operations continue with step 220.

The service provider then determines, from the CSP profile data stored in the interoperability database, if the CSP supports interoperability, step 220. If the CSP does not support interoperability an error message is returned, step 230, and the session is terminated, step 370 (FIG. 3C). If the service provider 201 determines that the CSP does support interoperability, operations continue with step 250 (FIG. 3B).

The service provider 201 then accesses the interoperability database (customer profile data) and identifies the products and versions thereof which are available to the customer in an interoperable fashion, step 250. The set of products available to a customer in an interoperable fashion is known as an interoperability suite. The pool of products available is determined by the service provider. Then, a CSP determines which of the pool of products that CSP wishes to be available to its customers, and which of those products, and for which customers, are available in an interoperable fashion. Thus, each customer is associated with a customized interoperability suite. The CSP preferably exclusively makes the determination as to the products included in a customer's interoperability suite, or a CSP may allow a customer to make the determination.

Once the service provider 201 identifies the customer's interoperability suite the service provider 201 determines if the product the customer is utilizing is included in the interoperability suite for that customer, step 260. A customer's interoperability suite could be stored as a unique list for that customer, or an indication could be stored in a list of all products, and versions thereof, offered in an interoperable fashion of which customer can access which products, and versions thereof, in an interoperable fashion. If the customer is utilizing a product which is not a part of the interoperability suite, an error message is returned, step 270, and the session is terminated, step 370 (FIG. 3C).

If the product the customer is utilizing is included in the interoperability suite, the service provider then determines if the version of the product the customer is utilizing is included in the interoperability suite, step 290. If not, an error message is returned, step 300, and the session is terminated, step 370 (FIG. 3C). If so, customer authentication is completed and the interoperable EBP session begins, step 340. Operations continue with step 350 (FIG. 3C).

At step 350 the service provider 201 determines if the EBP session has ended. If so, a farewell presentation is presented to the user, step 360, and the session is terminated, step 370. If not, operations continue with step 380, discussed below.

Introduced above, the present invention also utilizes product/service tables. Product/service tables serve as a basis for determining the features which are to be supported in providing interoperable services. A singular product/service table includes a listing of products which are interoperable for a given customer, as well as the features of each product. Each feature is found on the same row in any product/service table. FIG. 4 is a simplified exemplary depiction of a product/service table 400. As shown, each feature is associated with a unique row 405A-405J, and each product is associated with a unique column 410A-410C. For features that are not supported by a given product, no entry for that feature under that product will be included in a product/service table.

At step 380 the service provider 201 determines each feature to be included as a part of the next customer presentation. To do so, the service provider 201 accesses an authority database which includes a listing of all features for each presentation. The service provider 201 compiles this listing of features into an index/feature list (not shown) which includes the index pointer of each included feature into the product/service table. If a given feature is present in any one or more interoperable products, that feature is only included once in the index/feature list.

Figure 3D:
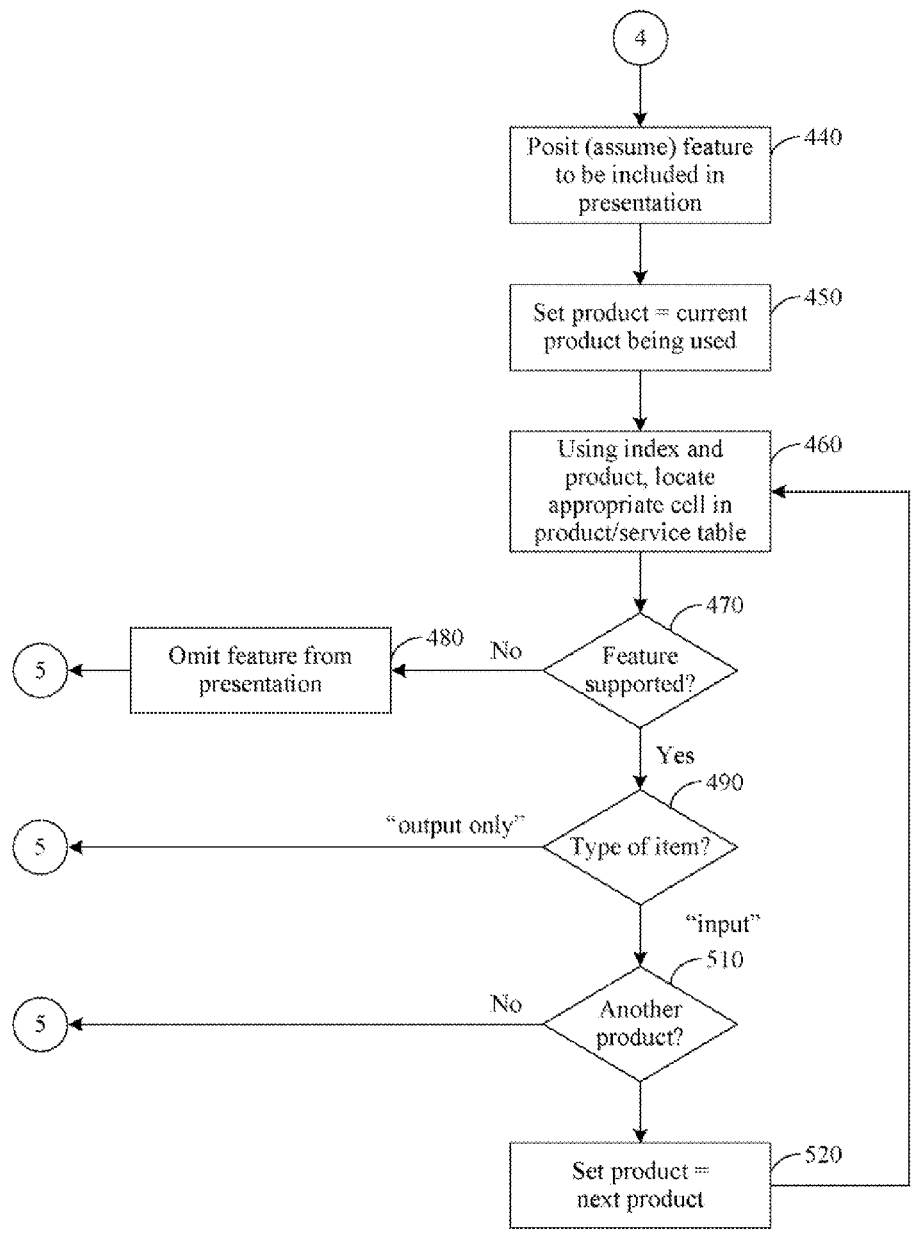

After compilation of the index/feature list, the service provider 201 reads the first entry (or next entry, upon subsequent processing, to be discussed below) from the index/feature list, including index pointer associated with that entry, step 390. At step 400 a determination as to if there is another entry to read is made. If so, the service provider 201 stores a provisional indication that the entry's associated feature will be included in the presentation, step 440 (FIG. 3D). The service provider 201, at step 450, sets a product flag to indicate that the product the customer is presently utilizing to access the service provider 201 is the product to be examined, as described below.

At step 460 the service provider 201, utilizing the retrieved index pointer and the product flag, accesses the customer's product service table 400 and locates the appropriate cell in the product/service table. A cell is the intersection of a product's column, for example, one of columns 410A-410B of FIG. 4, and a feature row, for example, one of rows 405A-405J. The service provider then determines if that feature is supported by the currently flagged product, step 470.

If there is no entry in the appropriate cell (feature not supported by flagged product), the service provider 201 removes the provisional indication that the feature will be included in the presentation, step 480. Operations continue with step 400 (FIG. 3C).

If there is an entry in the appropriate cell (feature supported by flagged product), the service provider 201 determines a type of the feature, step 490. Features are either 'output only' features, or 'input' features. 'Output only' features only present information to customers. This information is typically stored information, though it could be generated as needed for presentation. 'Input' features require the customer to provide information to the service provider. Typically this is done via an enterable or selectable field, though it could be done otherwise.

'Output only' features do not require any operations of the service provider 201 other than presentation of information. Introduced above, 'output only' information is typically stored information. In accordance with the present invention, transactional information generated in providing EBP services is stored in the common data repository. An 'output only' feature does not add information to the common data repository. Further, an 'output only' feature does not result in any information which must be stored for later use or affect any other feature. Thus, an 'output only' feature that is available in less than all interoperable products available to a consumer can be supported by the service provider 201 in an interoperable fashion. If the determined type of feature is an 'output only' feature, operations continue with step 390 (FIG. 3C). The provision indication of inclusion becomes an indication of inclusion.

If the determined type of feature is an 'input' feature, operations continue with step 510, in which the service provider 201 determines if there is another product in the customer's product/service table 400. If not, operations continue with step 390 (FIG. 3C). If so, operations continue with step 520, in which the product flag is set to next unexamined product available to the customer in an interoperable fashion. Operations then continue with step 460. At this next pass through step 460, the feature which was just determined to be an 'input' feature is still under examination. Thus, at step 470, if the 'input' feature is not supported by this product, the provision indication of inclusion in the presentation is removed and operations continue with step 390 (FIG. 3C). This process continues until either it is determined that the 'input' feature is not supported by one of the interoperable products, in which case the feature will not be presented, or it is determined that the 'input' feature is supported by each of the interoperable products, in which case the feature will be presented.

As shown in FIG. 3D, each exit of this feature loop leads to step 390 (FIG. 3C), in which the service provider 201 attempts to read the next unexamined feature entry from the index/feature list. Then, a determination is made as to if another entry was read, step 400. If so, operations resume with step 440, described above. The service provider 201 determines if this feature is to be included in the presentation, as discussed above and shown in steps 440-520. If, at step 400, it is determined that there is not another unexamined feature entry in the index/feature list, the tailored presentation is presented, step 410. At step 420 a new user request is received.

At step 430 the service provider performs tailored validations. Performing tailored validations includes, for those features which are input features, storing an indication as to the expected form of user input. Thus, when the expected user input is received, the stored indication is retrieved and the received input is validated as to correct form. Additionally, tailored validations can extend to actually encompass a specific set of permissible user input values.

Next, at step 350, the service provider determines if the session has ended. If not, a next tailored presentation is developed, as described above. If so, a farewell presentation is presented to the user, step 360, and the session is terminated, step 370.

For those customers not associated with a CSP, the processing to provide interoperable service is essentially the same as described above, with steps 170-230 being omitted. That is, following step 150, operations continue with either step 160 or step 250.

FIGS. 5A-5D are simplified depictions of product/service tables for multiple combinations of products $P_1$, $P_2$, and $P_3$. These tables are merely exemplary depictions of possible services and features that could be offered in either an interoperable fashion or a non-interoperable fashion. The product/service table 500A of FIG. 5A depicts a combination of each of products $P_1$, $P_2$, and $P_3$. The product/service table 500B of FIG. 5B depicts a combination of products $P_1$ and $P_2$. The product/service table of FIG. 5C depicts a combination of products $P_1$ and $P_3$. The product/service table of FIG. 5D depicts a combination of products $P_2$ and $P_3$. It should be understood that a selection of a combination of products offered in an interoperable fashion could be dictated by a CSP, by the service provider 201, by a customer, or any combination thereof.

With reference to FIG. 2 and FIG. 5A, customers $C_{100}$-$C_{105}$ are provided EBP services exclusively via product $P_1$, customers $C_{120}$-$C_{126}$ are provided EBP services exclusively via product $P_2$, and customers $C_{127}$-$C_{132}$ are provided EBP services exclusively via product $P_3$. It should be noted that CSP-3 and CSP-5 only offer interoperable service to their customers. The remaining CSPs and the service provider 201 each offer both interoperable services and non-interoperable services. For non-interoperable customers, it should be understood that that the one of the multiple products used to access EBP services is not modified in any way due to interoperability concerns. Further, the services supported by that product are not modified in any way due to interoperability concerns.

Thus, non-interoperable customers utilizing product $P_1$ can access the service of pay-anyone bill payments having the features of add one time payment, add monthly recurring payments, add weekly recurring payments, and history presentation, the service of electronic billing having the features of bill summary presentation, bill detail presentation, and advertising presentation, and the service of person-to-person payments having the features of add person-to-person payment and add electronic greeting card.

Non-interoperable customers utilizing product $P_2$ can access the service of pay-anyone bill payments having the features of add one time payment, add extended payment information, and add monthly recurring payments, the service of electronic billing having the features of bill summary presentation, bill detail presentation, and submit bill payment, and the service of person-to-person payments having the features of add person-to-person payment and add person-to-person invitation.

Non-interoperable customers utilizing product $P_3$ can access the service of pay-anyone bill payments having the features of add one time payment, add extended payment information, add monthly recurring payments, add weekly recurring payments, add twice monthly recurring payments, and history presentation, and the service of electronic billing having the feature of bill summary presentation.

With further reference to FIG. 2 and FIG. 5A, the service provider 201 and CSP-3 207 each offers each of products $P_1$, $P_2$, and $P_3$, in an interoperable fashion. That is, EBP services can be accessed via any one of those products by any one of customers $C_{106}$-$C_{111}$ and $C_{117}$-$C_{119}$. These customers will be able to utilize the services of pay-anyone bill payments and electronic billing. The service of person-to-person payments will not be available to these customers, as each of the features of this service are 'input' features, with none of these features available in products $P_3$.

For the service of pay-anyone bill payments, the 'input' features of add one time payment and add monthly recurring payments will be available. The 'input' features of add weekly recurring payments, add extended payment information, and add twice monthly recurring payments will not be available, as each is not a feature of each of the products. The 'output only' feature of history presentation will be available to these customers, as it is an 'output only' feature. This feature, though, will only be available when utilizing products $P_3$ or $P_1$, though payments submitted via product $P_2$ will appear in the history.

For the services of electronic billing, the 'output only' features of bill summary presentation, bill detail presentation, and advertising presentation will be available to these customers. Bill summary presentation will be available when using any of the products. Bill detail presentation will be available when utilizing products $P_2$ or $P_1$. Advertising presentation will be available when utilizing only product $P_1$. The 'input' feature of submit bill payment will not be available to these customers because it is not supported by all of the products. It further should be noted that this feature will not be available in any of the other combinations because product $P_2$ is the only product offering this 'input' feature.

With reference to FIG. 2 and FIG. 5B, CSP-5 209 offers products $P_1$ and $P_2$ in an interoperable fashion. That is, customers $C_{133}$-$C_{135}$ can access EBP services via any one of products $P_1$ and $P_2$. These customers will be able to utilize the services of pay-anyone bill payments, electronic billing, and person-to-person payments.

For the service of pay-anyone bill payments, the 'input' features of add one time payment and add monthly recurring payments will be available. The 'input' features of add extended payment information and add weekly recurring payments will not be available, as each is a feature not present in one of the products. The feature of history presentation will be available to these customers, as it is an 'output only' feature. This feature, though, will only be available when utilizing products $P_1$, though payments submitted via product $P_2$ will appear in the history.

For the service of electronic billing, the 'output only' features of bill summary presentation, bill detail presentation, and advertising presentation will be available to these customers. Bill summary presentation and bill detail presentation will be available when using either of the products. Advertising presentation will be available when utilizing only product $P_1$. The 'input' feature of submit bill payment will not be available to these customers because it is not supported by both products.

For the service of person-to-person payments, the 'input' feature of add person-to-person payments will be available. The 'input' features of add electronic greeting card and add person-to-person invitation will not be available because they are not supported by both products.

With reference to FIG. 2 and FIG. 5C, CSP-2 206 offers products $P_1$ and $P_3$ in an interoperable fashion. That is, customers C112-C114 can access EBP services via any one of products P1 and P3. These customers will be able to utilize the services of pay-anyone bill payments and electronic billing. However, these customers will not be able to utilize the service of person-to-person payments, as that service is only supported by product $P_1$.

For the service of pay-anyone bill payments, the 'input' features of add one time payment, add monthly recurring payment, and add weekly recurring payment will be available. The 'input' features of add extended payment information and add twice monthly recurring payments will not be available, as each is a feature not present in one of the products. The feature of history presentation will be available to these customers, as it is a feature that is both an 'output only' feature and available in both products. This feature will be available when utilizing products $P_1$ or $P_3$.

For the service of electronic billing, the 'output only' features of bill summary presentation, bill detail presentation, and advertising presentation will be available to these customers. Bill summary presentation will be available when using either of the products. The features of bill detail presentation and advertising presentation will be available when utilizing only product $P_1$.

With reference to FIG. 2 and FIG. 5D, CSP-1 205 offers products $P_2$ and $P_3$ in an interoperable fashion. That is, EBP services can be accessed via any one of products $P_2$ and $P_3$ by customers $C_{115}$ and $C_{116}$. These customers will be able to utilize the services of pay-anyone bill payments and electronic billing.

For the service of pay-anyone bill payments, the 'input' features of add one time payment, add extended payment information, and add monthly recurring payments will be available. The 'input' features of add weekly recurring payments and twice monthly recurring payments will not be available, as each is a feature not present in one of the products. The 'output only' feature of history presentation will be available to these customers, as it is an 'output only' feature. This feature will be available only when utilizing product $P_3$, though payments submitted via product $P_2$ will appear in the history.

For the service of electronic billing, the 'output only' features of bill summary presentation and bill detail presentation will be available to these customers. Bill summary presentation will be available when using either of the products. The feature of bill detail presentation will be available when utilizing only product $P_2$. The 'input' feature of submit bill payment will not be available, as this feature is not common to both products.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A computer-implemented method, comprising:
    receiving, by an electronic commerce (EC) service provider computing system comprising one or more computers, a request on behalf of a user for an electronic commerce (EC) service, wherein the request is associated with a first user interface that is associated with a user device;
    determining, by the EC service provider computing system based on a user profile associated with the user, that a plurality of interoperable user interfaces is available to the user;
    determining, by the EC service provider computing system, that the first user interface is one of the plurality of interoperable user interfaces;
    determining, by the EC service provider computing system, one or more output features supported by the first user interface, wherein each of the one or more output features presents respective content to the user;
    identifying, by the EC service provider computing system for each of the plurality of interoperable user interfaces, a respective set of one or more input features associated with the EC service and supported by the respective interface, wherein each of the one or more input features requests respective information from the user to be supplied via data entry or option selection;
    generating, by the EC service provider computing system for the user, a customized set of one or more interoperable input features by determining one or more common input features that are included in all of the respective sets of input features for the plurality of interoperable user interfaces;

generating, by the EC service provider computing system in response to the request, a customized user presentation that includes the determined one or more output features and the customized set of one or more interoperable input features;

transmitting, by the EC service provider computing system, the customized user presentation for presentation through the first user interface;

receiving, by the EC service provider computing system, a response to the transmitted customized user presentation; and performing, by the EC service provider computing system, tailored validation of the response in accordance with the customized set of one or more interoperable input features.

2. The computer-implemented method of claim 1, wherein determining one or more output features comprises determining one or more output features based upon the output capabilities of the first user interface.

3. The computer-implemented method of claim 1, wherein the request is a first request, the customized set of interoperable input features is a first customized set of interoperable input features and the customized user presentation is a first customized user presentation, and further comprising:

receiving, by the EC service provider computing system, a second request for the EC service on behalf of a second user;

generating, by the EC service provider computing system, a second customized user presentation responsive to the second request, wherein the second customized user presentation includes a second customized set of one or more interoperable input features, and wherein the second customized set of interoperable input features are supported by each of a plurality of interoperable user interfaces associated with the second user; and transmitting, by the EC service provider computing system, the generated second customized user presentation.

4. The computer-implemented method of claim 1, wherein the EC service is one of (i) electronic billing and payment services, (ii) bill payment, (iii) electronic billing, (iv) person-to-person payment, (v) investment services, (vi) retail payment, (vii) tax filing or payment, or (vii) financial records reconciliation.

5. The computer-implemented method of claim 1, wherein the request is a first request, the plurality of interoperable user interfaces is a first plurality of interoperable user interfaces, the user is a first user, the customized set of interoperable input features is a first customized set of interoperable input features, and the customized user presentation is a first customized user presentation, and further comprising:

receiving, by the EC service provider computing system, a second request for the EC service on behalf of a second user;

determining, by the EC service provider computing system, that a second plurality of interoperable user interfaces associated with the EC service is available to the second user, wherein the second plurality of interoperable user interfaces is different than the first plurality of interoperable user interfaces;

generating, by the EC service provider computing system for the user, a second customized set of one or more interoperable input features supported by at least two interoperable user interfaces of the second plurality of interoperable user interfaces;

generating, by the EC service provider computing system in response to the second request, a second customized user presentation that includes the second customized set of interoperable input features, wherein the second customized user presentation is different from the first customized user presentation; and transmitting, by the EC service provider computing system, the generated second customized user presentation.

6. The computer-implemented method of claim 1, wherein performing tailored validation of the response comprises:

storing, by the EC service provider computing system prior to transmitting the user presentation, one or more indications associated with expected input for the customized set of interoperable input features; and determining, by the EC service provider computing system utilizing the stored one or more indications, whether input information included in the received response is one of (i) in an expected form or (ii) a permissible value.

7. The computer-implemented method of claim 1, wherein the request is a first request and the user is a first user and further comprising:

receiving, by the EC service provider computing system, a second request for the EC service on behalf of a second user;

identifying, by the EC service provider computing system, the second user as a non-interoperable user; and responding to the second request with a stored user interface.

8. The computer-implemented method of claim 1, wherein the request comprises (1) instructions for receiving an electronic bill or (2) instructions for making a payment on behalf of the user.

9. The computer-implemented method of claim 1, wherein the customized user presentation is one of a telephone-based user presentation, a user computer-based user presentation, or a Web-based user presentation.

10. The computer-implemented method of claim 1, wherein the request is a first request and the customized user presentation is a first customized user presentation, the EC service is a first EC service and further comprising:

receiving, by the EC service provider computing system, a second request for a second EC service on behalf of the user;

generating, by the EC service provider computing system, a second customized user presentation responsive to the second request without consideration of the EC service input features being supported by at least two interoperable user interfaces; and transmitting the generated second customized user presentation.

11. A system, comprising:

a memory having stored thereon a database including stored information associated with at least one user interface;

a processor, in communication with the database, wherein the processor executes software instructions to:

receive a request on behalf of a user for an electronic commerce (EC) service, wherein the request is associated with a first user interface that is associated with a user device;

determine, based at least in part on the stored information and a user profile associated with the user, that a plurality of interoperable user interfaces is available to the user;

determine that the first user interface is one of the plurality of interoperable user interfaces;

determine one or more output features supported by the first user interface, wherein each of the one or more output features presents respective content to the user;

identify, for each of the plurality of interoperable user interfaces, a respective set of one or more input features associated with the EC service and supported by the respective interface, wherein each of the one or more input features requests respective information from the user to be supplied via data entry or option selection;

generate, for the user, a customized set of one or more interoperable input features by determining one or more common input features that are included in all of the respective sets of input features for the plurality of interoperable user interfaces;

generate a customized user presentation in response to the request that includes the determined one or more output features and the customized set of one or more interoperable input features;

direct transmission of the customized user presentation for presentation through the first user interface;

receive a response to the transmitted customized user presentation; and perform tailored validation of the response in accordance with the customized set of one or more interoperable input features.

12. The system of claim 11, wherein the one or more output features are determined based upon the output capabilities of the first user interface.

13. The system of claim 11, wherein the request is a first request, the EC service is a first EC service, and the customized user presentation is a first customized user presentation, and wherein the processor executes additional software instructions to:

receive a second request for the EC service on behalf of a second user;

generate a second customized user presentation responsive to the second request without consideration of the EC service input features being supported by at least two interoperable user interfaces; and direct transmission of the generated second customized user presentation.

14. The system of claim 11, wherein the request is a first request and the customized user presentation is a first customized user presentation, the customized set of one or more interoperable input features is a first customized set of interoperable input features, and wherein the processor executes additional software instructions to:

receive a second request for a second EC service on behalf of the user;

generate a second customized user presentation responsive to the second request, wherein the second customized user presentation includes a second customized set of interoperable input features supported by a non-interoperable user interface; and direct transmission of the generated second customized user presentation.

15. The system of claim 11, wherein the request is a first request, the plurality of interoperable user interfaces is a first plurality of interoperable user interfaces, the user is a first user, the customized set of one or more interoperable input features is a first customized set of interoperable input features, and the customized user presentation is a first customized user presentation, and wherein the processor executes additional software instructions to:

receive a second request for the EC service on behalf of a second user;

determine a second set of interoperable user interfaces associated with the EC service that is available to the second user, wherein the second set of interoperable user interfaces is different than the first set of interoperable user interfaces;

generate a second customized set of one or more interoperable input features supported by at least two interoperable user interfaces of the second plurality of interoperable user interfaces for inclusion in a second customized user presentation;

generate a second customized user presentation in response to the request, wherein the second customized user presentation includes the second customized set of interoperable input features, and wherein the second customized user presentation is different from the first customized user presentation; and direct transmission of the generated second customized user presentation.

16. The system of claim 11, wherein the processor performs the tailored validation by:

storing, prior to the transmission of the user presentation, one or more indications associated with expected input for the customized set of interoperable input features; and determining, utilizing the stored one or more indications, whether input information included in the received response is one of (i) in an expected form or (ii) a permissible value.

17. The system of claim 11, wherein the request is a first request and the user is a first user and wherein the processor executes additional software instructions to:

receive a second request for the EC service on behalf of a second user;

identify the second user as a non-interoperable user; and respond to the second request with a stored user presentation.

18. The system of claim 11, wherein the request comprises (1) instructions for receiving an electronic bill or (2) instructions for making a payment on behalf of the user.

19. The system of claim 11, wherein the customized user presentation is one of a telephone-based user presentation, a user computer-based user presentation, or a Web-based user presentation.

20. The system of claim 11, wherein the EC service is one of (i) electronic billing and payment services, (ii) bill payment, (iii) electronic billing, (iv) person-to-person payment, (v) investment services, (vi) retail payment, (vii) tax filing or payment, or (vii) financial records reconciliation.

21. The system of claim 11, wherein the request is received from a user or a sponsor of the user.

* * * * *